United States Patent [19]
Winter

[11] Patent Number: 5,983,613
[45] Date of Patent: Nov. 16, 1999

[54] VACUUM MOWER

[76] Inventor: Rex Coker Winter, 2900 Maple La., Fairfax, Va. 22031

[21] Appl. No.: 08/965,779

[22] Filed: Nov. 7, 1997

Related U.S. Application Data

[60] Provisional application No. 60/029,959, Nov. 8, 1996.

[51] Int. Cl.$^6$ .......................... A01D 61/00; A01D 87/10
[52] U.S. Cl. ................................ 56/13.3; 56/16.6; 56/202
[58] Field of Search ......................... 56/202, 13.3, 13.4, 56/16.6, 16.9, DIG. 8, DIG. 9

[56] References Cited

U.S. PATENT DOCUMENTS

| | | |
|---|---|---|
| 2,762,184 | 9/1956 | Farrer . |
| 3,037,339 | 6/1962 | Nicholson . |
| 3,935,695 | 2/1976 | Merry . |
| 3,940,827 | 3/1976 | Greco . |
| 3,984,893 | 10/1976 | Ashley . |
| 3,987,606 | 10/1976 | Evans . |
| 4,095,398 | 6/1978 | Aumann et al. . |
| 4,262,475 | 4/1981 | Takahashi et al. ..................... 56/202 X |
| 4,407,112 | 10/1983 | Shepherd et al. . |
| 4,411,125 | 10/1983 | Strickland . |
| 4,488,395 | 12/1984 | Mack . |
| 4,941,231 | 7/1990 | Jarosak ............................ 56/DIG. 8 X |
| 5,231,827 | 8/1993 | Connolly et al. . |
| 5,542,242 | 8/1996 | Poulos ................................... 56/202 X |

FOREIGN PATENT DOCUMENTS 2 235 639  1/1975  France .

*Primary Examiner*—H. Shackelford
*Attorney, Agent, or Firm*—Richard C. Litman

[57] ABSTRACT

An attachment for a rotary lawn mower or a riding mower having a blower assembly located in an elevated position for effectively vacuuming and collecting debris generated by the operation of the mower. The debris discharged from the mower chute is drawn upwardly through a transfer tube and, via the blower assembly, is directed into a collection storage container. The blower assembly is operatively powered via an extended shaft from the drive system of the mower blade or a drive shaft extending from the top of the mower's engine. The collection container is mounted on the housing of the mower, the handle of the mower, or on a platform to the rear of the mower. A lid covers the open top of the container, and includes a perforated portion that allows air to escape from the container. A side door is provided in the container, to assist in removing the debris or a plastic trash bag used to hold the debris, from the container. Near the top of the container, an opening is included for receiving the debris from the blower.

20 Claims, 6 Drawing Sheets

VACUUM MOWER

CROSS-REFERENCE TO RELATED APPLICATION

This application claims the benefit of U.S. Provisional Patent Application Ser. No. 60/029,952, filed Nov. 8, 1996.

BACKGROUND OF THE INVENTION

1. Field of the Invention

The present invention relates to a blower attachment for a rotary lawn mower or a riding mower and, more specifically, to a blower assembly for a lawn mower that is located in an elevated position for effectively vacuuming and collecting mowing debris in an upright container.

2. Description of Prior Art

Equipment for vacuuming and collecting debris generated by the operation of a lawn mower are well known in the property maintenance art, as exemplified by the following prior art. These prior art devices, however, tend to require special receptacles for collecting the debris, and/or separate drive systems and motors or engines for the blower assemblies.

U.S. Pat. No. 2,762,184, issued on Sep. 11, 1956, to Ray R. Farrer, describes a lawn mower blower attachment which directs mowing debris downwardly into a transfer tube for collection in an offset basket. Farrer does not disclose a lawn mower attachment having a blower assembly located in an elevated position at the upper end of an upstanding transfer tube, whereby the blower assembly effectively vacuums debris upwardly through the transfer tube and directly into an upright collection storage container. U.S. Pat. No. 3,037,339, issued on Jun. 5, 1962, to Laurence E. Nicholson, discloses a power lawn mower grass catcher having a ground driven wheel for elevating grass clippings to a collection receptacle. An upwardly directed blower on a lawn mower is seen in U.S. Pat. No. 3,935,695 issued Feb. 3, 1976, to Richard C. Merry.

U.S. Pat. No. 3,940,827, issued on Mar. 2, 1976, to Salvatore T. Greco, teaches a leaf vacuuming attachment for rotary lawn mowers wherein the lawn mower blade is used as a blower for collecting leaves in the mower's grass catcher. U.S. Pat. No. 3,984,893, issued on Oct. 12, 1976, to Marion L. Ashley and U.S. Pat. No. 4,095,398, issued on Jun. 20, 1978, to Richard F. Aumann et al. both describe collecting devices for use with a tractor-type rotary mower, each having a vacuum blower which is mounted on the base of a flexible hose. U.S. Pat. No. 3,987,606, issued on Oct. 26, 1976, to Lee D. Evans shows a grass clipping collection apparatus having a blower that may be driven by a power take-off from the engine of the mower. Details of the power take-off are not disclosed. U.S. Pat. No. 4,407,112, issued on Oct. 4, 1983, to Ian C. Sheperd et al. discusses a grass mower with a blower mounted above the cutting blades.

U.S. Pat. No. 4,411,125, issued on Oct. 25, 1983, to Huber E. Strickland shows a multi-function apparatus for lawn maintenance that includes a mulcher/blower driven by the shaft of the mower's engine. Debris is collected in a rear porous bag. U.S. Pat. No. 4,488,395, issued Dec. 18, 1984, to Ralph B. Mack discloses a multiple purpose lawn mower with a blower mounted above the cutting blades. Air from the blower is used to propel mowing debris upward into a bag-like receptacle. U.S. Pat. No. 5,231,827, issued Aug. 3, 1993, to Kevin J. Connolly et al. shows a lawn and garden chipper shredder vacuum apparatus with a rear collection bag. French Patent No. 2,235,639, dated Jan. 31, 1975, to Bernard Moteurs, teaches a lawn mower having a debris transfer screw for transporting mowing debris to a rear collection receptacle.

These patents do not disclose an attachment for a rotary lawn mower having a blower assembly located in an elevated position at the upper end of a transfer tube, whereby the blower assembly effectively vacuums debris upwardly through the transfer tube and blower, into a collection storage container.

None of the above inventions and patents, taken either singly or in combination, is seen to describe the instant invention as claimed.

SUMMARY OF THE INVENTION

The present invention relates to an attachment for a walk behind type rotary lawn mower or a riding mower having a blower assembly located in an elevated position for effectively vacuuming and collecting debris, such as grass clippings, leaves and the like, generated by the operation of the mower. The debris discharged from the mower chute is drawn upwardly through a transfer tube and the blower assembly, and into a collection storage container. The mower's engine powers the vacuum blower assembly using an extended shaft from the drive system of the mower blade, or from a second end of the engine's drive shaft that extends from the top of the mower's engine. This configuration allows the blower assembly to be powered by the mower's existing engine, thus eliminating the need for a separate power source.

The collection container is mounted on the housing of the mower, the handle of the mower, or on a platform to the rear of the mower. A lid covers the open top of the container, and includes a perforated portion that allows air to escape from the container. A side door is provided in the container, to assist in removing the debris or a plastic trash bag used to hold the debris from the container. Near the top of the container, an opening is included for receiving the debris from the blower.

Accordingly, it is a principal object of the invention to provide an attachment for a walk behind type rotary lawn mower or a riding mower, whereby a blower assembly effectively vacuums debris discharging from the mower chute into a collection storage container.

It is another object of the invention to provide an attachment for a mower having a blower assembly powered by the mower's engine, via an extended shaft from a pulley of the drive system of the mower blade or from an extended drive shaft from the top of the mower's engine.

It is a further object of the invention to provide a mower attachment having a transfer tube that provides a passageway from the mower chute via a blower assembly to a cut out port in the side or top of a collection container.

Still another object of the invention is to provide a blower/vacuum attachment for a mower that is light in weight, contains few moving parts and is fabricated of durable material, thereby making the attachment suitable for maintenance by the consumer.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

In its broadest aspect, the present invention is an attachment for a walk behind type rotary lawn mower or a riding mower having a blower assembly located in an elevated position for effectively vacuuming and collecting debris generated by the operation of the mower. The debris discharged from the mower chute is drawn upwardly through a flexible, rigid or a combined flexible and rigid transfer tubular structure (hereinafter referred to as the transfer tube), via the blower assembly duct and into a collection storage container. The collection container may have a cylindrical or rectangular-box shape. The blower assembly is operatively powered via an extended shaft from the drive system of the mower blade.

Figure 1:
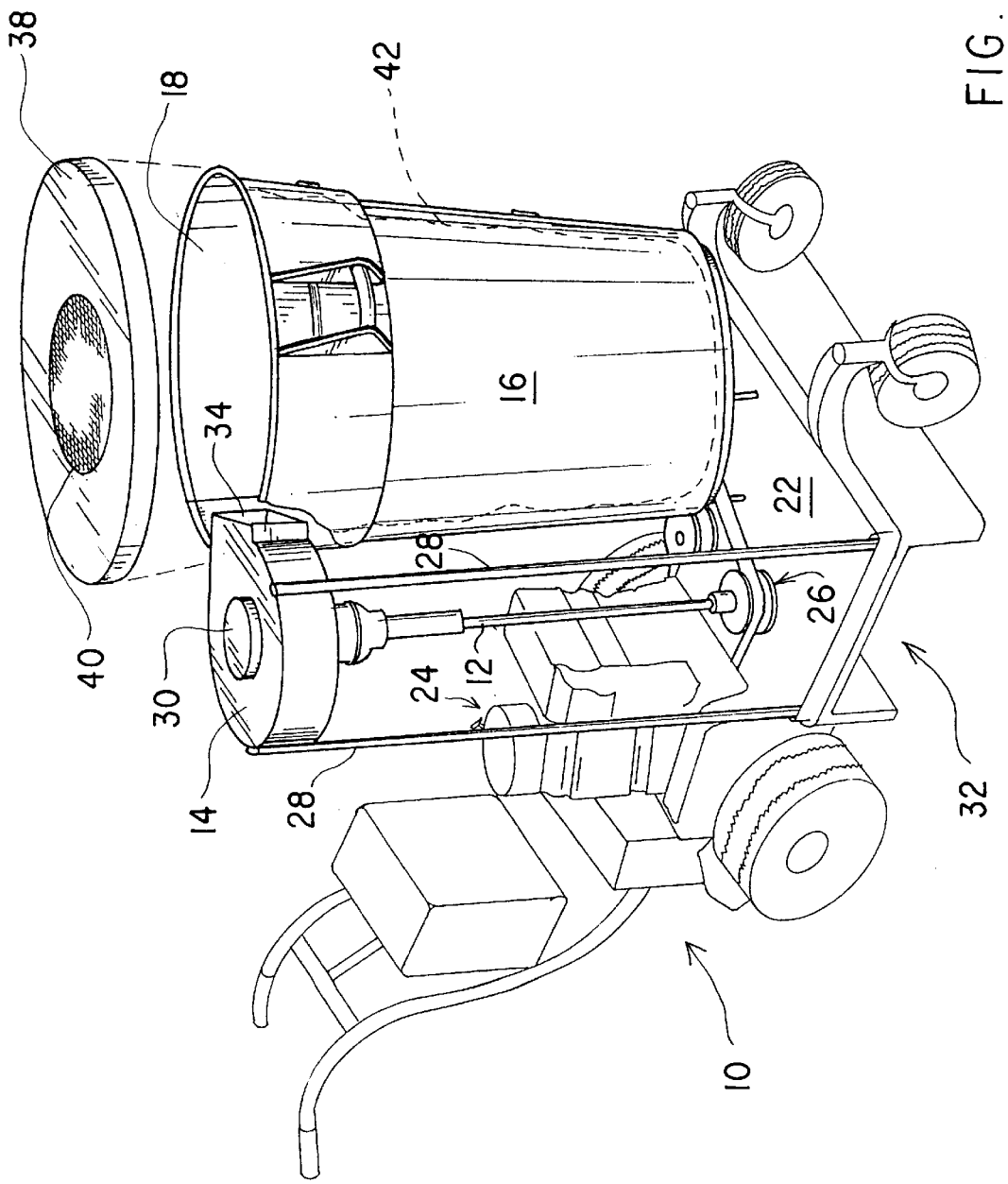
FIG. 1 is a perspective view of the lawn mower attachment mounted on a rotary mower in accordance with a first embodiment of the present invention.

Referring to FIG. 1, the attachment device is shown mounted on a rotary lawn mower 10, in accordance with the first embodiment of the present invention. It should be noted that the transfer tube has been removed for clarity of the view. The attachment device is made up of an attachment drive arrangement having a vertical extension shaft member 12, an elevated or top mounted blower assembly 14, and a vertically-positioned collection container 16 having an open top 18. The collection container 16 is a conventional trash can of the cylindrical-type.

Figure 2:
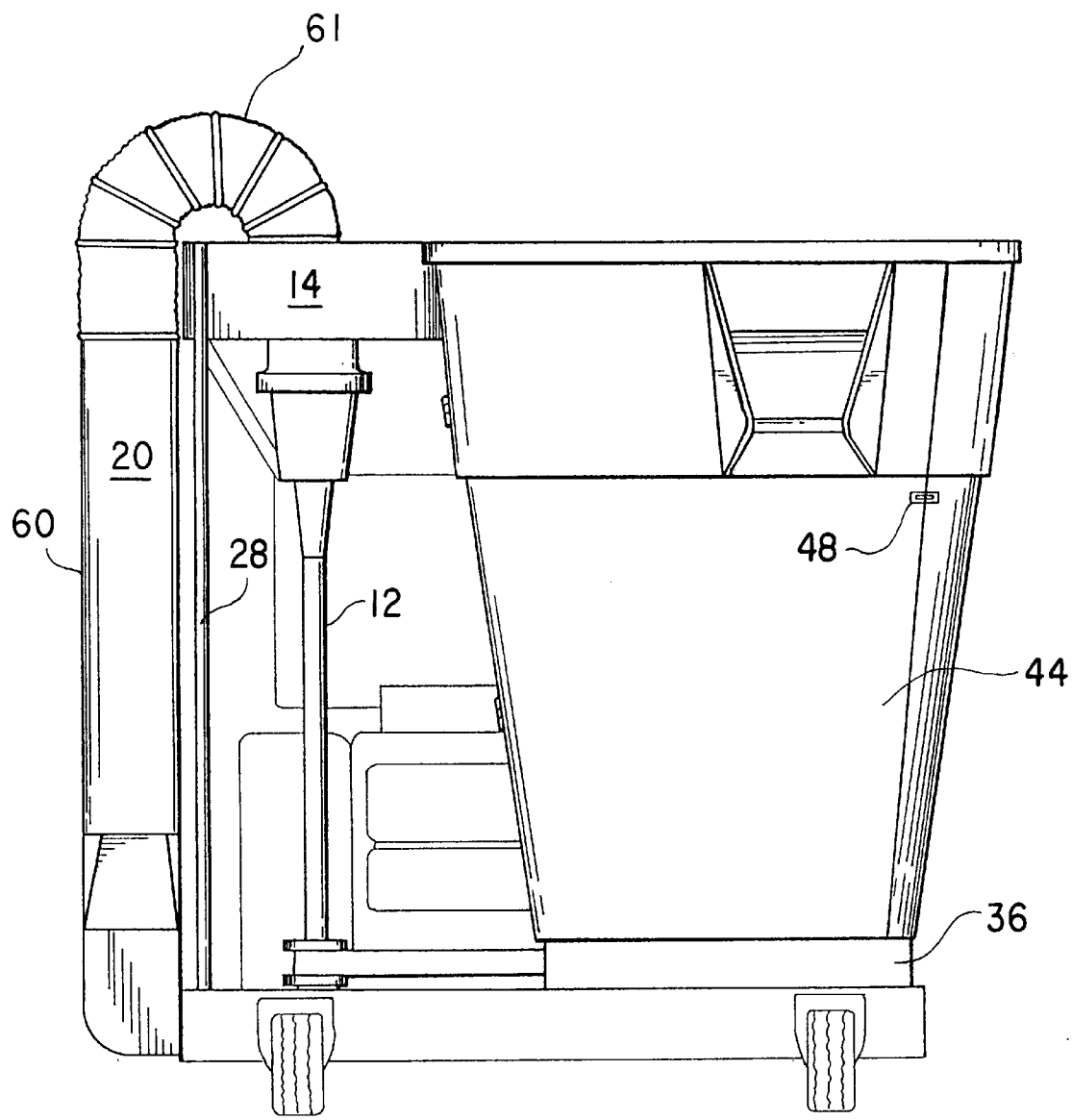
FIG. 2 is a front elevational view of the lawn mower and the attachment.
Figure 3:
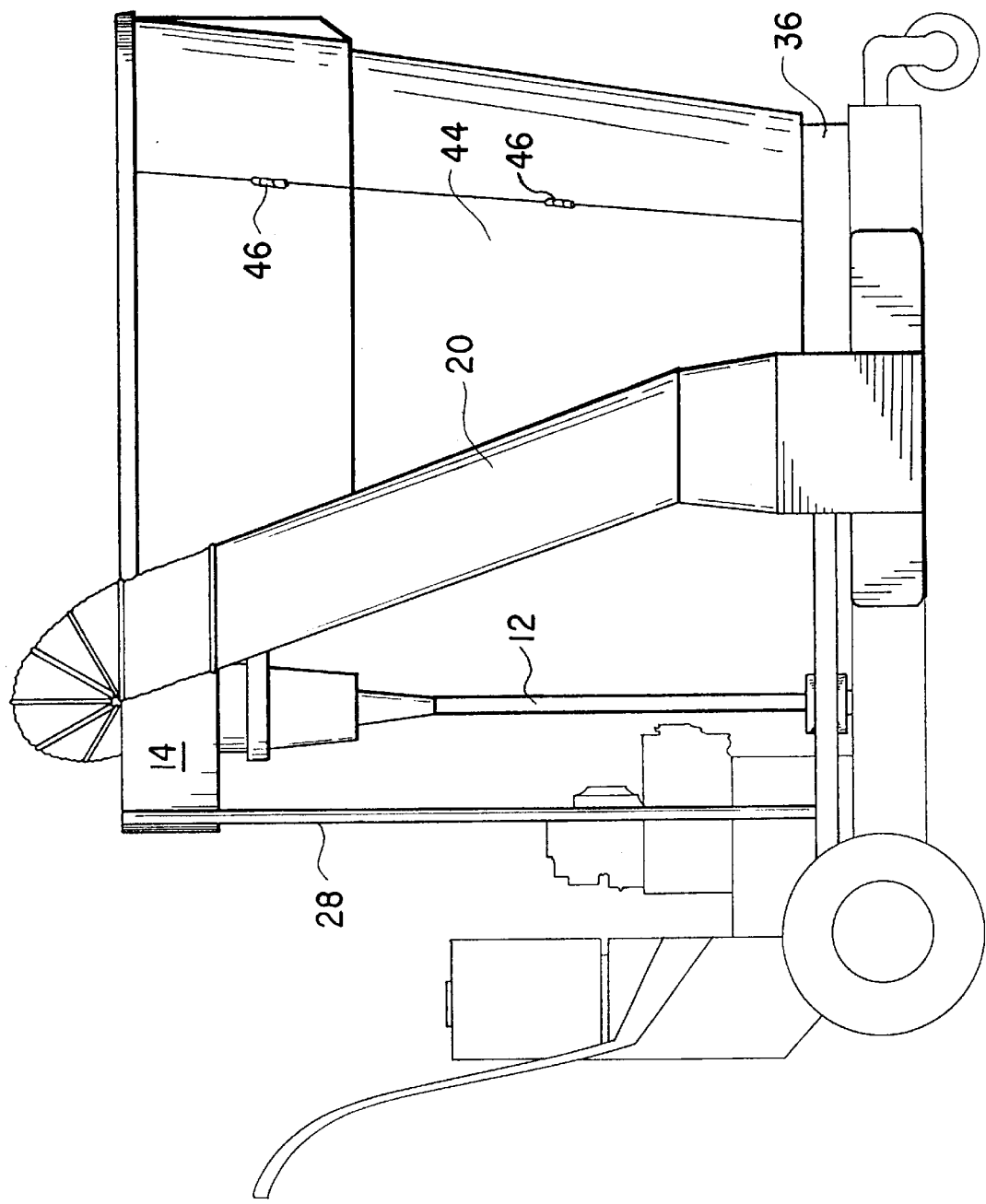
FIG. 3 is a left side elevational view of the lawn mower and the attachment of FIG. 2.
Figure 4:
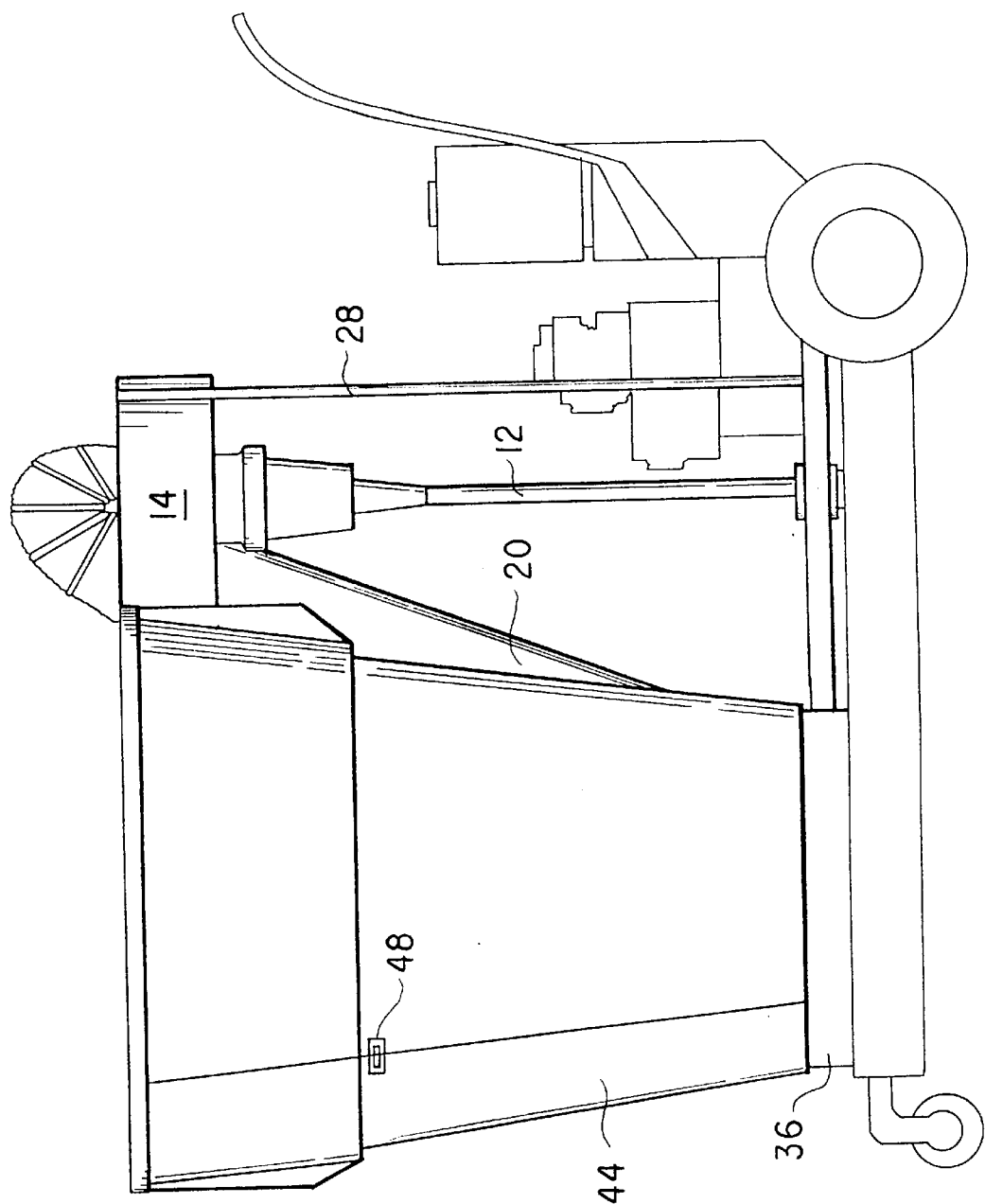
FIG. 4 is a right side elevational view of the lawn mower and the attachment of FIG. 2.

The attachment device also includes a transfer tube 20 which is seen in FIGS. 2–4. The transfer tube 20 can be a rigid, flexible or a combined rigid and flexible tubular structure. When a combined rigid and flexible transfer tube is used, section 60 is rigid, and section 61 is flexible. The lawn mower 10 is provided with a housing 22 having a platform area for supporting the attachment device.

Figure 6:
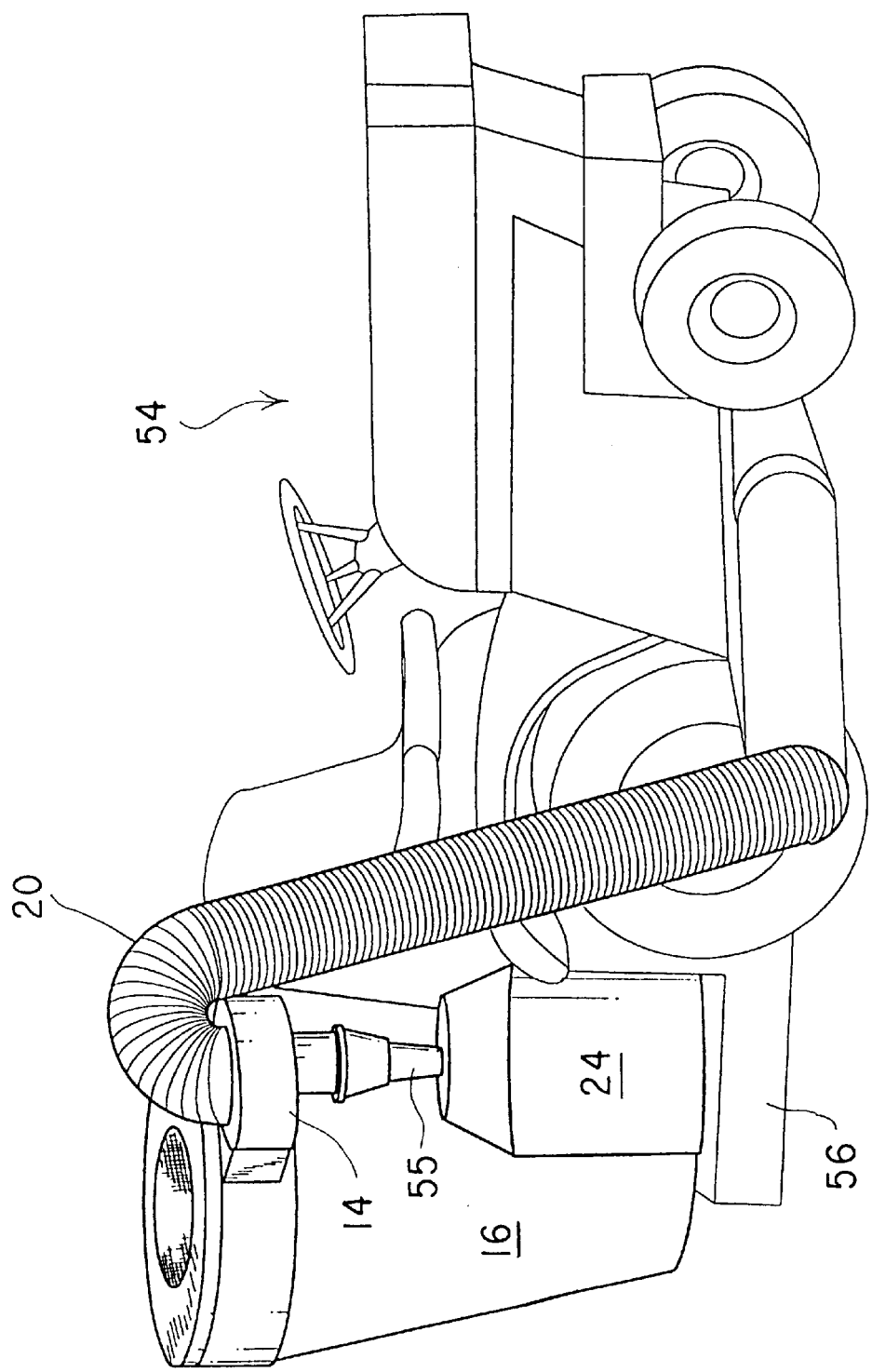
FIG. 6 is a perspective view of a riding mower, showing the collection container mounted on a rear platform, in accordance with a third embodiment of the present invention.

The mower 10 is provided with a conventional internal combustion engine 24, although it will be appreciated that an electric, battery or solar motor may be employed without departing from the scope of the present invention. The mower 10 may include a drive system for the blower assembly 14 such as a double-ended drive shaft (as indicated in FIG. 6 as 55), wherein one end of the drive shaft extends from the top of the motor. Such a drive shaft system would be substituted for the extension shaft member 12 for powering the blower assembly 14. The attachment drive arrangement includes a suitable pulley-type drive system 26 operatively connected to the vertical shaft member 12 that extends upwardly from the mower housing 22. In the preferred embodiment of the invention, drive shaft 12 is attached to a preexisting pulley of the drive system. If necessary, an additional pulley may be added to the drive system, or a preexisting pulley may be moved to an appropriate location under the blower assembly 14. The vertical drive shaft 12 protrudes upwardly through the bottom wall of the blower assembly 14 and is operatively connected to the fan of the blower assembly 14.

The blower assembly 14 is supported by a framework consisting of at least two or more vertically-positioned bars 28 equally spaced from each other and fixedly mounted at their lower ends to the mower housing 22. The upper ends of the vertical bars 28 are fixedly attached to sidewall of the cylindrical-shaped blower assembly 14. The framework bars 28 are dimensioned and configured to be substantially the same height as the height of the vertical collection container 16. Thus, the bars 28 support the blower assembly 14 in an elevated and spaced position with respect to the mower housing 22.

As seen in FIG. 1, the top wall of the blower assembly 14 has a centrally-positioned circular opening 30. As shown in FIGS. 2–4, the upper end of the transfer tube 20 extends upwardly, includes a 180° turn, extends downwardly a short distance and terminates at the opening 30 of the blower assembly 14. The lower end of the transfer tube 20 is operatively connected into a discharge chute 32 of the mower 10 (See FIG. 3). Further, as seen in FIG. 1, a cut-out section of the sidewall of the collection container 16 reveals a substantially square-shaped exit port 34 on the blower assembly 14. While port 34 is preferably square-shaped, the port 34 may be circular. The port 34 provides a passageway for debris being discharged from the blower assembly 14, into the adjacent collection container 16.

As seen in FIG. 2, the vertical-positioned collection container 16 is supported on a horizontal platform 36 which is mounted on the mower housing 22. The container 16 is balanced on the platform 36 to achieve maximum stability during operation of the mower 10. The position of the container 16 on the mower housing 22 provides an uninterrupted vortex-type transfer of the debris therein. A lid or top 38 is provided for covering the open top 18 of the collection container 16. The lid 38 has a centrally positioned perforated section 40 made of a screen material. The perforated section 40 allows air that is transported with the debris, to be released from the collection container 16. The container 16 may include an inserted flexible plastic trash bag 42 (shown in dotted lines in FIG. 1) for bagging the collected debris. It has been found that a plastic bag 42 filled with debris can be difficult to remove from through the open top 18 of the collection container 16. To this end, a full-length door 44 is constructed on the sidewall of the cylindrical collection container 16 to provide easy access for removing a plastic bag full of debris. The door 44 has a plurality of hinges 46 and a door latch 48. The collection container 16 is preferably a 55 gallon-type and is made of a strong plastic material, fiberglass, metal or the like.

The attachment for the mower 10 provides a substantially closed system of travel for the debris being processed through the transfer tube 20 and the blower assembly 14 and into the collection container 16. The perforated lid section 40 provides sufficient ventilation for the travel flow to operate successfully. It has been found that the attachment of the blower assembly 14 in its elevated position can effectively vacuum the generated debris upwardly and process the debris to the collection container 16 without clogging the travel path.

Figure 5:
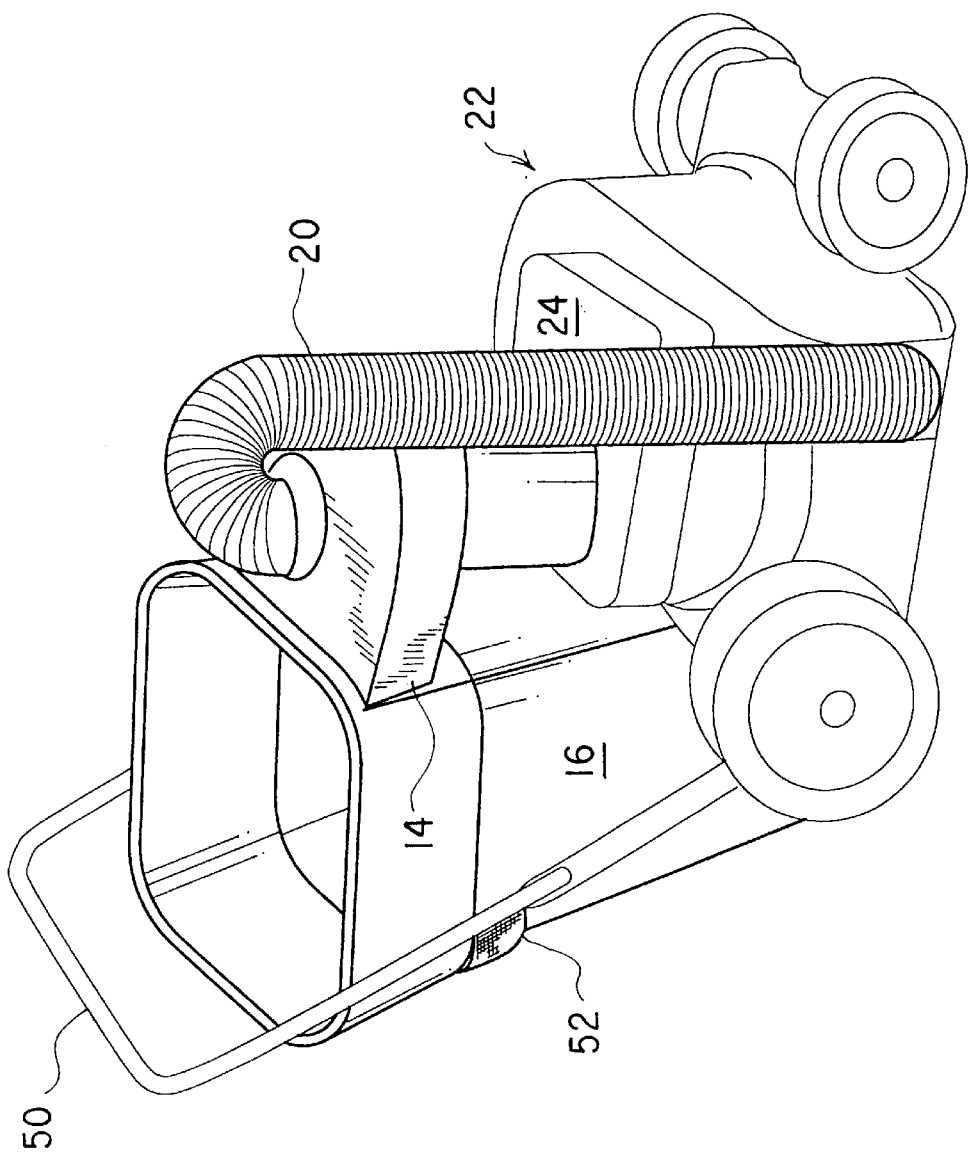
FIG. 5 is a perspective view of a rotary lawn mower, showing the collection container mounted on the rear of the rotary lawn mower, in accordance with a second embodiment of the present invention.

FIG. 5 shows a second embodiment of the present invention wherein the collection container 16 is mounted at the rear of the rotary lawn mower 10. The container 16 is of the rectangular-box-type. The container 16 is fitted snugly and tightly within the U-shaped configuration of a conventional-type handle 50. U-shaped handle 50 is attached to the rear of the mower housing 22 with its arms extending upwardly at an oblique angle thereto. A band or strap 52 wraps around the rear portion of the container 16 near the top of the wall of container 16. The strap 52 thereby secures the container 16 to the arms of the U-shaped handle 50 and the bottom of the container 16 is positioned a short distance above the ground. It should be noted that the shaft driving the blower assembly is operatively connected to the top of the drive shaft of engine 24. This connection is configured to mate with the specific structure of the top of the mower, (depending on the manufacturer and type of engine used on the mower).

FIG. 6 shows a third embodiment of the present invention associated with a riding tractor-type mower 54. The collection container 16 and its associated shaft member and blower assembly 14 are mounted on a platform 56 which is either an integral part of the tractor's housing or is attached thereto. Container 16 is shown as a cylindrical-shaped type. Thus, the attachment of the present invention can be used with the riding tractor-type mower 54 as well as the rotary-type mower 10.

It will be evident that the vacuum action of the blower assembly 14, plus the vibrations of the mower operation itself will assist in processing the debris, (by loosening them within the system) to an elevated level within reasonable limits. The distance that the debris is elevated should be sufficient so that the debris can be easily moved through the attachment passageways into an collection container of an adequate size which is supported above the mower housing.

Various modifications could be made to the present invention. For example, the transfer tube 20 could be disconnected from the mower chute 32 and used to directly vacuum debris from areas other than the mower chute 32. Additionally, a separate collection hose may be attached directly to the blower assembly 14 or to the transfer tube 20.

It is to be understood that the present invention is not limited to the embodiments described above, but encompasses any and all embodiments within the scope of the following claims.

I claim:

1. An attachment device mounted on a rotary lawn mower for collecting debris generated by the rotary lawn mower, the rotary lawn mower including a housing, a blade drive system and a mower chute, said attachment device comprising:

a collection container having an open top and a port;

a lid for covering said open top of said collection container;

a framework having an upper portion and a lower portion, said lower portion being attached to and supported by the mower housing, said framework being dimensioned and configured to be substantially the same height as the height of said collection container;

a blower assembly attached to said upper portion of said framework and being positioned adjacent said open top of said collection container, said blower assembly being operatively powered via an extension drive arrangement by the rotary mower blade drive system, said blower assembly communicating with said collection container through said port; and a transfer tube having an upper end and a lower end, said upper end being connected to said blower assembly and said lower end being connected to the mower chute;

whereby said blower assembly operatively vacuums the debris discharging from the mower chute upwardly through said transfer tube and said blower, and into said collection container.

2. The attachment device according to claim 1, wherein said lid for said collection container has a centrally positioned perforated section for releasing air from said collection container.

3. The attachment device according to claim 1, wherein said port is a cut-out port.

4. The attachment device according to claim 1, wherein:
said collection container is a cylindrically-shaped container having a sidewall; and
a portion of said sidewall constitutes a door member.

5. The attachment device according to claim 1, wherein:
said collection container is a rectangular-box-type container having a sidewall; and
a portion of said sidewall constitutes a door member.

6. The attachment device according to claim 5, further comprising a strap member attached to said rectangular-box-type container, said strap member securing said container to the rotary lawn mower.

7. The attachment device according to claim 1, wherein said collection container is a vertically-positioned upright container.

8. The attachment device according to claim 1, wherein said extension drive arrangement includes an extended shaft member.

9. The attachment device according to claim 1, wherein said collection container is mounted on the mower housing.

10. The attachment device according to claim 1, wherein said collection container is mounted on a platform adjacent to the rear of the rotary lawn mower.

11. An attachment device mounted on a rotary lawn mower for collecting debris generated by the rotary lawn mower, the rotary lawn mower including a housing, a blade drive system, a mower chute and a U-shaped handle, said attachment device comprising:

a rectangular-box-shaped collection container having an open top and a port;

a lid for covering said open top of said collection container;

a framework having an upper portion and a lower portion, said lower portion being attached to and supported by the mower housing, said framework being dimensioned and configured to be substantially the same height as the height of said collection container;

a blower assembly attached to said upper portion of said framework and being positioned adjacent said open top of said collection container, said blower assembly being operatively powered via an extension drive arrangement by the rotary mower blade drive system, said blower assembly communicating with said collection container through said port;

a transfer tube having an upper end and a lower end, said upper end being connected to said blower assembly and said lower end being connected to the mower chute;

whereby said blower assembly operatively vacuums the debris discharging from the mower chute upwardly through said transfer tube and said blower, and into said collection container; and a strap member attached to said rectangular-box-type container, said strap member securing said container to the U-shaped handle.

12. A mower including a housing, a blade drive system, a chute and an attachment device, said attachment device comprising:

a collection container having an open top and a port;

a lid for covering said open top of said collection container;

a framework having an upper portion and a lower portion, said lower portion being attached to and supported by said mower housing, said framework being dimensioned and configured to be substantially the same height as the height of said collection container;

a blower assembly attached to said upper portion of said framework and being positioned adjacent said open top of said collection container, said blower assembly being operatively powered via an extended arrangement by said blade drive system, said blower assembly communicating with said collection container through said port; and a transfer tube having an upper end and a lower end, said upper end being connected to said blower assembly and said lower end being connected to said mower chute;

whereby said blower assembly operatively vacuums debris discharging from said mower chute upwardly through said transfer tube and said blower, and into said collection container.

13. The mower according to claim 12, wherein said lid for said collection container has a centrally positioned perforated section for releasing air from said collection container.

14. The mower according to claim 12, wherein said port is a cut-out port.

15. The mower according to claim 12, wherein:

said collection container is a cylindrically-shaped container having a sidewall; and a portion of said sidewall constitutes a door member.

16. The mower according to claim 12, wherein:

said collection container is a rectangular-box-type container having a sidewall; and a portion of said sidewall constitutes a door member.

17. The mower according to claim 12, wherein said collection container is a vertical container positioned on said mower housing.

18. The mower according to claim 12, wherein said transfer tube is made of a flexible material.

19. The mower according to claim 12, wherein said transfer tube is made of a rigid material.

20. The mower according to claim 12, wherein said transfer tube is removable from said chute, to thereby allow said blower assembly to operatively vacuum debris not generated by said mower.

* * * * *